United States Patent
Lee et al.

(10) Patent No.: US 10,608,216 B2
(45) Date of Patent: Mar. 31, 2020

(54) BATTERY MODULE AND BATTERY PACK INCLUDING SAME

(71) Applicant: LG CHEM, LTD., Seoul (KR)

(72) Inventors: Jung-Hoon Lee, Daejeon (KR); Jeong-O Mun, Daejeon (KR); Dal-Mo Kang, Daejeon (KR); Byoung-Cheon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 147 days.

(21) Appl. No.: 15/759,036

(22) PCT Filed: Jun. 8, 2017

(86) PCT No.: PCT/KR2017/005968
§ 371 (c)(1),
(2) Date: Mar. 9, 2018

(87) PCT Pub. No.: WO2018/021680
PCT Pub. Date: Feb. 1, 2018

(65) Prior Publication Data
US 2019/0189982 A1    Jun. 20, 2019

(30) Foreign Application Priority Data

Jul. 25, 2016    (KR) .................. 10-2016-0094228

(51) Int. Cl.
*H01M 14/00*    (2006.01)
*H01M 2/10*    (2006.01)
(Continued)

(52) U.S. Cl.
CPC .......... *H01M 2/1061* (2013.01); *H01M 2/10* (2013.01); *H01M 2/1077* (2013.01); *H01M 2/30* (2013.01);
(Continued)

(58) Field of Classification Search
CPC .... H01M 2/1061; H01M 2/1077; H01M 2/30; H01M 10/0472; H01M 2220/20
See application file for complete search history.

(56) References Cited

U.S. PATENT DOCUMENTS

| | | |
|---|---|---|
| 8,785,018 B2 | 7/2014 | Nam et al. |
| 2012/0156543 A1* | 6/2012 | Cicero .................. H01M 2/024 429/120 |

(Continued)

FOREIGN PATENT DOCUMENTS

| | | |
|---|---|---|
| EP | 0 771 038 A1 | 5/1997 |
| EP | 1 990 861 A1 | 11/2008 |

(Continued)

OTHER PUBLICATIONS

International Search Report for PCT/KR2017/005968 (PCT/ISA/210) dated Sep. 29, 2017.

*Primary Examiner* — Jane J Rhee
(74) *Attorney, Agent, or Firm* — Birch, Stewart, Kolasch & Birch, LLP (57) ABSTRACT

A battery module is provided. According to an embodiment of the present disclosure, the battery module may include: a cartridge assembly including a plurality of cartridges, each receiving a battery cell; a casing surrounding the cartridge assembly; and a support member configured to enclose the casing for supporting the casing.

13 Claims, 5 Drawing Sheets

(51) Int. Cl.
*H01M 10/04* (2006.01)
*H01M 2/30* (2006.01)

(52) U.S. Cl.
CPC .... *H01M 10/0472* (2013.01); *H01M 2220/20* (2013.01)

(56) References Cited

U.S. PATENT DOCUMENTS

| | | |
|---|---|---|
| 2013/0183571 A1 | 7/2013 | Miyazaki et al. |
| 2013/0288105 A1 | 10/2013 | Niedzwiecki et al. |
| 2015/0060170 A1 | 3/2015 | Templeman et al. |
| 2015/0079451 A1 | 3/2015 | Jeong et al. |
| 2016/0204400 A1 | 7/2016 | Baek et al. |

FOREIGN PATENT DOCUMENTS

| | | |
|---|---|---|
| JP | 5-56671 U | 7/1993 |
| KR | 10-2004-0043432 A | 5/2004 |
| KR | 10-0982327 B1 | 9/2010 |
| KR | 10-1285712 B1 | 7/2013 |
| KR | 10-2015-0109726 A | 10/2015 |
| KR | 10-2015-0129494 A | 11/2015 |
| WO | WO 2012/043594 A1 | 4/2012 |

\* cited by examiner

BATTERY MODULE AND BATTERY PACK INCLUDING SAME

TECHNICAL FIELD

The present application claims priority to Korean Patent Application No. 10-2016-0094228 filed on Jul. 25, 2016 in the Republic of Korea, the disclosure of which is incorporated herein by reference.

The present disclosure relates to a battery module and a battery pack including the same, and more particularly, to a battery module capable of easy fixing a casing without welding, and a battery pack including the same.

BACKGROUND ART

As technology development and demand for mobile devices have increased, demand for secondary batteries as an energy source has rapidly increased. Conventionally, nickel-cadmium batteries or hydrogen ion batteries have been used as secondary batteries. However, lithium secondary batteries have recently widely used which are free from charging and discharging due to little memory effect compared with nickel-based secondary batteries, have a low self-discharge rate and a high energy density.

Such a lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with such a positive electrode active material and a negative electrode active material, are arranged with a separator therebetween, and an outer material, that is, a battery case, for sealing and storing the electrode assembly together with an electrolyte solution.

The lithium secondary battery includes a positive electrode, a negative electrode, the separator therebetween, and an electrolyte. Depending on which one of the positive electrode active material and the negative electrode active material is used, the lithium secondary battery may be divided into a lithium ion battery (LIB), a polymer lithium ion battery (PLIB), and so on. Generally, electrodes of these lithium secondary batteries are formed by applying the positive electrode active material or the negative electrode active material to a current collector of aluminum or copper in a shape such as a sheet, a mesh, a film, and a foil, and by drying thereafter.

Generally, the battery module of the secondary battery may be combined with a casing to protect internal components from vibration or shock. However, when welding is used to fix the casing, thermal damage may occur in a battery cell inside the casing due to heat generated from the welding, and even if damage occurs by other various causes in the battery cell inside the casing, it may not be easy to remove the casing combined with the battery cell, so that it is difficult to replace or repair a damaged battery cell.

DISCLOSURE

Technical Problem

The present disclosure is designed to solve the problems of the related art, and therefore the present disclosure is directed to providing a battery module which may prevent thermal damage of a battery cell by fixing a casing without welding, and a battery pack including the same.

In addition, the present disclosure is directed to providing a battery module in which a damaged battery cell may be easily replaced or repaired due to easy separability of the casing, and a battery pack including the same.

In addition, the present disclosure is directed to providing a battery module which may simplify operations and reduce process defects, and a battery pack including the same.

Technical Solution

In one aspect of the present disclosure, there is provided a battery module including: a cartridge assembly including a plurality of cartridges, each receiving a battery cell; a casing surrounding the cartridge assembly; and a support member configured to enclose the casing for supporting the casing.

In addition, the support member may include a strap of a band shape.

In addition, at least one combining protrusion may be formed in the casing, and at least one combining groove, with which the combining protrusion is combined, is formed in the support member.

In addition, a first combining protrusion of the combining protrusions formed on the casing may be inserted into a first combining groove of the combining grooves formed in the support member, and bent and combined together.

In addition, a second combining protrusion of the combining protrusions formed on the casing may be formed in a hook shape and combined with a second combining groove of the combining grooves formed in the support member.

In addition, a third combining groove may be formed at one end of both side ends of the support member, and a third combining protrusion may be formed at the other end of the both side ends of the support member, wherein the third combining protrusion is inserted into the third combining groove, and bent and combined together.

In addition, at least one receiving unit including a receiving groove may be formed in the casing.

In addition, a catching hook to be combined with the receiving groove after being inserted into the receiving groove may be formed at each end of both side ends of the support member.

In addition, the catching unit may include a pair of catching hooks spaced apart from each other and configured to face in directions opposite to each other.

In addition, a slanted part may be formed in the catching hook to facilitate insertion into the receiving groove.

In addition, a round part may be formed in at least a portion of the catching hook.

In another aspect of the present disclosure, there is also provided a battery pack including a battery module described above and a vehicle including the battery module.

Advantageous Effects

According to the embodiments of the present disclosure, thermal damage of a battery cell may be prevented because a casing is fixed by using a support member without using welding.

In addition, the casing may be easily separated by removing a support member, thereby facilitating replacement or repair of a damaged battery cell inside the casing, which enables simple maintenance or repair.

In addition, a welding process may be eliminated so that an assembly work is simple, a work process is simplified, and there is no concern about the thermal damage, and process defects are reduced.

MODE FOR DISCLOSURE

Hereinafter, a battery module and a battery pack including the battery module according to embodiments of the present disclosure will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific portion constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

The term, 'combine' or 'connect' as used herein, may refer not only to a case where one member and another member are directly combined or directly connected but also a case where one member is indirectly combined to another member via a connecting member or indirectly connected.

Figure 1:
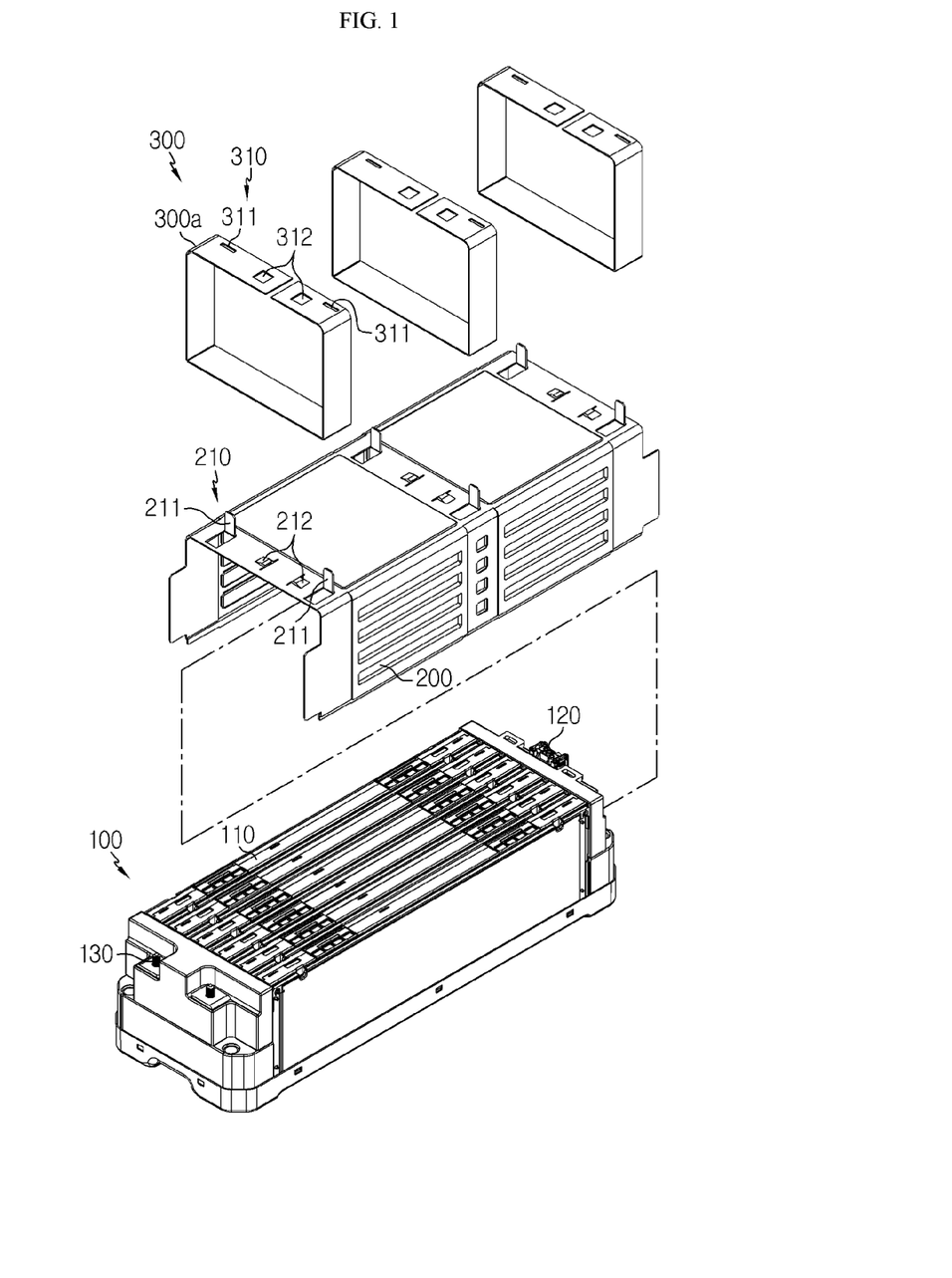
FIG. 1 is an exploded perspective view of a battery module according to a first embodiment of the present disclosure.
Figure 2:
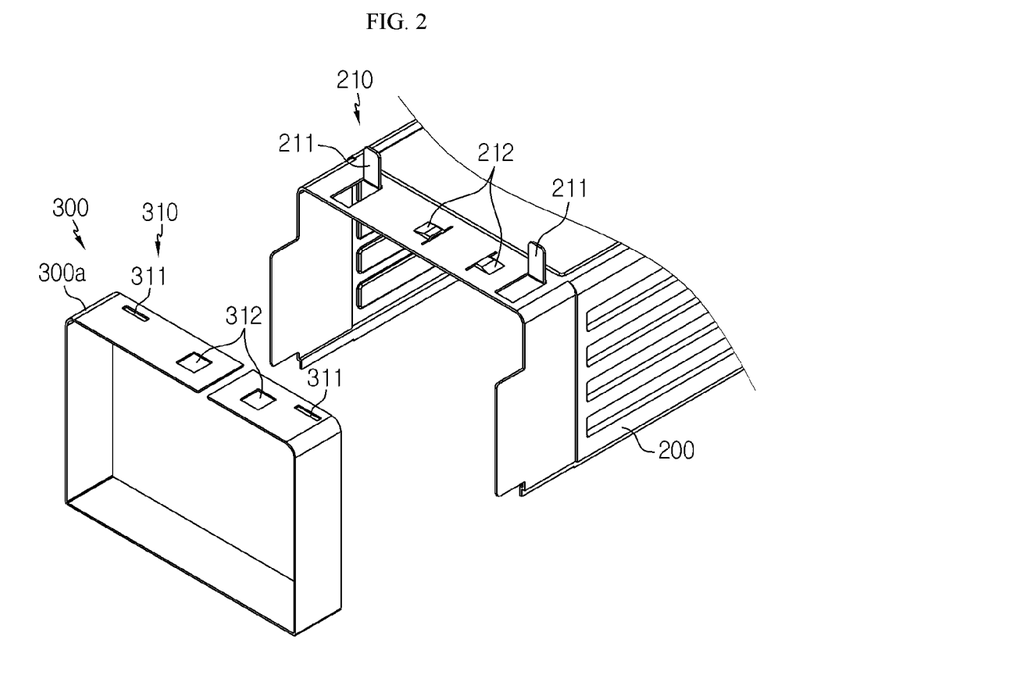
FIG. 2 is a view illustrating a state in which a support member is separated from a casing in the battery module according to the first embodiment of the present disclosure.
Figure 3:
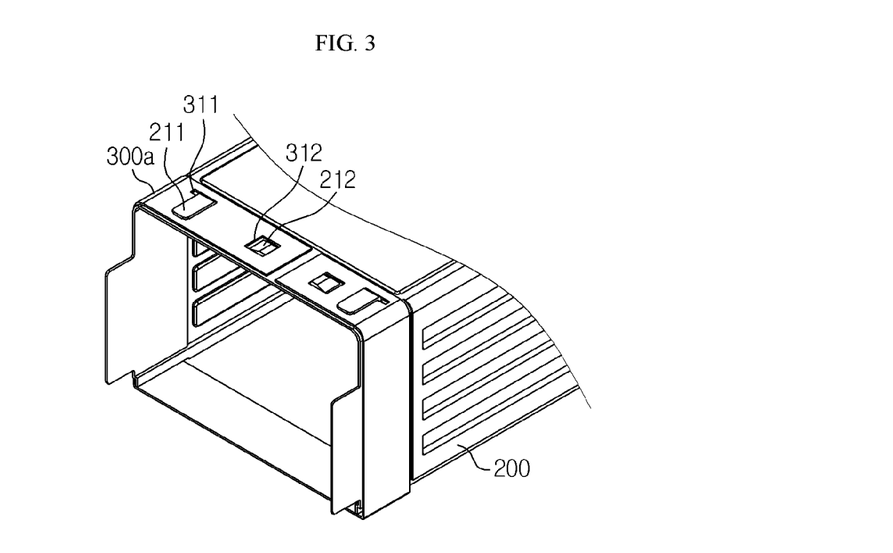
FIG. 3 is a view illustrating a state in which a support member is combined with a casing in the battery module according to the first embodiment of the present disclosure.

FIG. 1 is an exploded perspective view of a battery module according to an embodiment of the present disclosure, FIG. 2 is a schematic view illustrating a state in which a support member is separated from a casing in a battery module according to a first embodiment of the present disclosure, and FIG. 3 is a schematic view illustrating a state in which a support member is combined with a casing in a battery module according to the first embodiment of the present disclosure.

Referring to FIG. 1, a battery module 10 according to the first embodiment of the present disclosure may include a cartridge assembly 100, a casing 200, and a support member 300.

Referring to FIG. 1, the cartridge assembly 100 may include a plurality of cartridges configured to receive the battery cells 110. The cartridge assembly 100 may be manufactured via an injection molding of plastic and the plurality of cartridges including a receiving unit configured to receive the battery cells 110 may be stacked. The cartridge assembly 100 may be received in an inner space of the casing 200 and the battery cell 110 received in the cartridge may be received in the inner space of the casing 200 and be protected. The cartridge assembly 100 may include a connecting element 120 or a terminal element 130. The connecting element 120 may include various types of electrical connecting parts or connecting members for being connected to a battery management system (BMS) (not illustrated) and the like capable of providing data on voltage or temperature of the battery cell 110. In addition, the terminal element 130, as a main terminal, connected to the battery cell 110 may include a positive electrode terminal and a negative electrode terminal, and may be electrically connected to the outside via a terminal bolt.

Referring to FIG. 1, the casing 200 may enclose the cartridge assembly 100, thereby protecting the cartridge assembly 100 from external vibration or shock. The casing 200 may be formed in a shape corresponding to a shape of the cartridge assembly 100. For example, when the cartridge assembly 100 is provided in a hexahedral shape, the casing 200 may be provided in a hexahedral shape corresponding thereto. The casing 200 may be manufactured, for example, by overlaying metal plates. Here, the plurality of plates may be arranged so as to overlap each other and then, may be combined with a support member 300, which will be described later, so as to fix the casing 200 without a welding process.

Referring to FIGS. 1 through 3, the support member 300 may be provided to enclose an outside of the casing 200 after the cartridge assembly 100 is received in the casing 200, thereby supporting the casing 200. Here, the support member 300 may include various shapes and various materials, and may be provided with a strap 300a in a band shape, in particular, the strap 300a of metal material. Hereinafter, for convenience of explanation, a description will be centered on a case where the support member 300 is the strap 300a of metal material, but the support member 300 is not limited thereto. A combining protrusion 210 may be formed in the casing 200, and a combining groove 310 to which the coupling protrusion 210 formed on the casing 200 can be combined may be formed in the strap 300a. In other words, when the strap 300a encloses the casing 200, the combining protrusion 210 of the casing 200 may be combined to the coupling groove 310 of the strap 300a, and the strap 300 combined in this manner may fix the casing 200. One or more straps 300a may be provided and may be combined at various locations of the casing 200. For example, as illustrated in FIG. 1, three straps 300a may be provided to be combined at three locations, that is, both ends and a center portion of the casing 200, respectively. However, this is only an example, and the number and combining locations of the straps 300a may be more various. Various types of combining protrusions 210 may be included in the casing 200. For example, the casing 200 may include a first combining protrusion 211 which is inserted into a first combining groove 311 formed in the strap 300a, and then, folded and combined together. Referring to FIG. 2, the casing 200 may be provided with the first combining protrusion 211 arranged upwardly based on FIG. 2, and the strap 300a may be provided with a first combining groove 311 having a size corresponding to the first combining protrusion 311. In addition, after the strap 300a is combined with the casing 200 so that the first combining protrusion 211 of the casing 200 is inserted into the first combining groove 311 of the strap 300a, the combining protrusion 211 may be bent to fix the casing 200 to the strap 300a. In addition, the casing 200 may include a second combining protrusion 212 which is formed in a hook shape so as to be combined to a second combining groove 312 formed in the strap 300a. Referring to FIG. 2, the casing 200 may be provided with the second combining protrusion 212 which has a hook shape and protrudes obliquely from the casing 200, and when the strap 300a encloses the casing 200 as illustrated in FIG. 3, the second combining groove 312 formed in the strap 300a may be combined with the second combining protrusion 212, thereby fixing the casing 200. Here, only one of the first and second combining protrusions 211 and 212 may be formed in the casing 200, or both the first and second combining protrusions 211 and 212 may be formed. In this case, only one of the first and second combining grooves 311 and 312 may be formed in the strap 300a so as to correspond to the first and second combining protrusion 211 and 212, or both the first and second combining grooves 311 and 312 may be formed. Alternatively, a combining protrusion may be formed in the strap 300a and a combining groove may be formed in the casing 200, as needed.

Hereinafter, an operation and an effect of the battery module 10 according to the first embodiment of the present disclosure will be described with reference to the drawings.

Referring to FIG. 1, the cartridge assembly 100 may be received and protected by the casing 200, and the casing 200 may be fixed by being enclosed by the support member 300. The support member 300 may be the strap 300a of metal material provided in a band shape and one or more straps 300a may be combined at various locations of the casing 200 so as to fix the casing 200. Here, the casing 200 may be provided with the first combining protrusion 211 which is inserted into the first combining groove 311 formed in the strap 300a, and then, bent so as to fix the strap 300a and the casing 200. Alternatively, the second combining protrusion 212 of a hook shape may be formed which protrudes from the casing 200 so as to be combined to the second combining groove 312 formed in the strap 300a.

In other words, as described above, since one or more straps 300a can fix the casing 200 without welding, heat generated during welding may not be transferred to the battery cell 110 received in the casing 200 and thus, thermal damage of the battery cell 110 may be prevented. In addition, as described above, since the welding process is eliminated, an assembly work may be simple and a repair work may be simplified, and since there is no concern about the thermal damage of the battery cell 110, process defects may be reduced. In addition, since the casing 200 can be easily separated by cutting the strap 300a and the like when an abnormal phenomenon such as breakage or damage occurs in the battery cell 110 and the like, the battery cell 110 may be easily replaced or mended and thus, maintenance or repair thereof may be easy.

Figure 4:
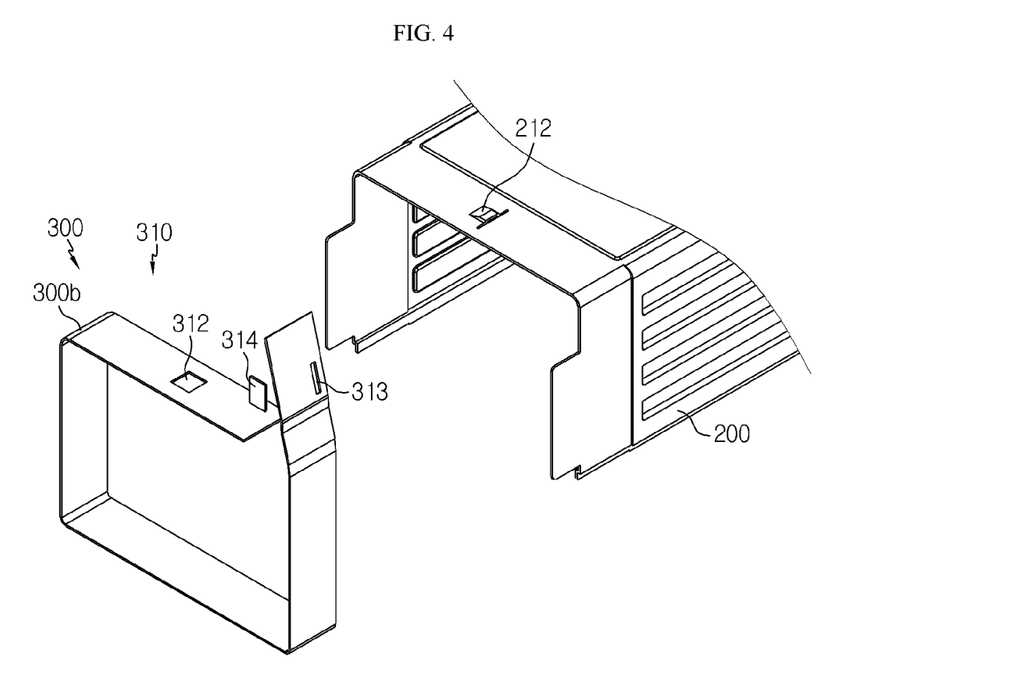
FIG. 4 is a view illustrating a state in which a support member is separated from a casing in a battery module according to a second embodiment of the present disclosure.
Figure 5:
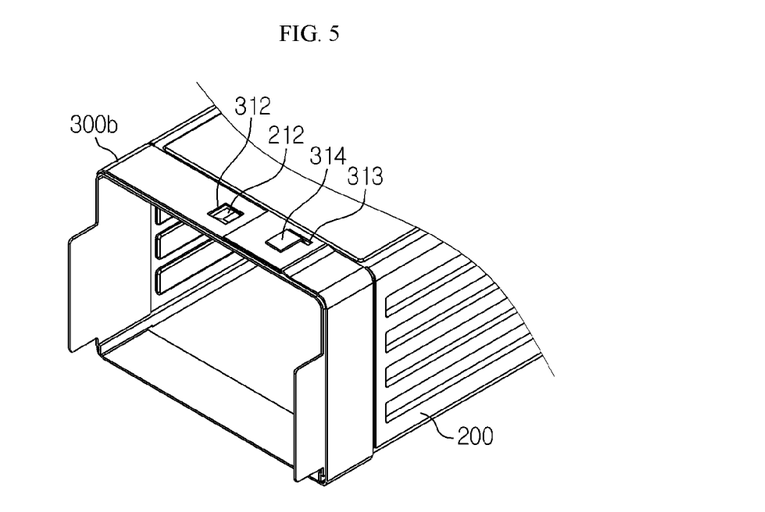
FIG. 5 is a view illustrating a state in which a support member is combined with a casing in the battery module according to the second embodiment of the present disclosure.

FIG. 4 is a schematic view illustrating a state in which a support member is separated from a casing in a battery module according to a second embodiment of the present disclosure, and FIG. 5 is a schematic view illustrating a state in which a support member is combined with a casing in a battery module according to the second embodiment of the present disclosure.

Hereinafter, functions and effects of the battery module 10 according to the second embodiment of the present disclosure will be described with reference to the drawings. However, portions common to contents described for the battery module 10 according to the first embodiment of the present disclosure will be replaced by previous descriptions.

The second embodiment of the present disclosure is different from the first embodiment in that a third combining groove 313 and a third combining protrusion 314 are formed at both side ends of the support member 300, respectively.

Referring to FIG. 4, the third combining groove 313 may be formed at one end of the both side ends of the strap 300b and the third combining protrusion 314 may be formed at the other end of the both side ends of the strap 300b. When the strap 300b surrounds the casing 200, the third combining protrusions 314 and the third combining groove 313 which are respectively formed at the both side ends of the strap 300b may be combined to each other so as to fix the casing 200. Here, the third combining protrusion 314 formed at the other end of the strap 300b may be provided to face upward based on FIG. 4, and as illustrated in FIG. 5, after the third combining protrusion 314 is inserted into the third combining groove 313, the third combining protrusion 314 may be bent and fixed to the third combining groove 313 so that the strap 300b can fix the casing 200.

On the other hand, in the second embodiment, the second combining protrusion 212 of a hook shape may be formed in the casing 200 and the second combining groove 312 to which the hook-shaped second combining protrusion 212 is to be combined may be formed on the strap 300b, and a detailed description thereof will be replaced by previous description in the first embodiment.

Figure 6:
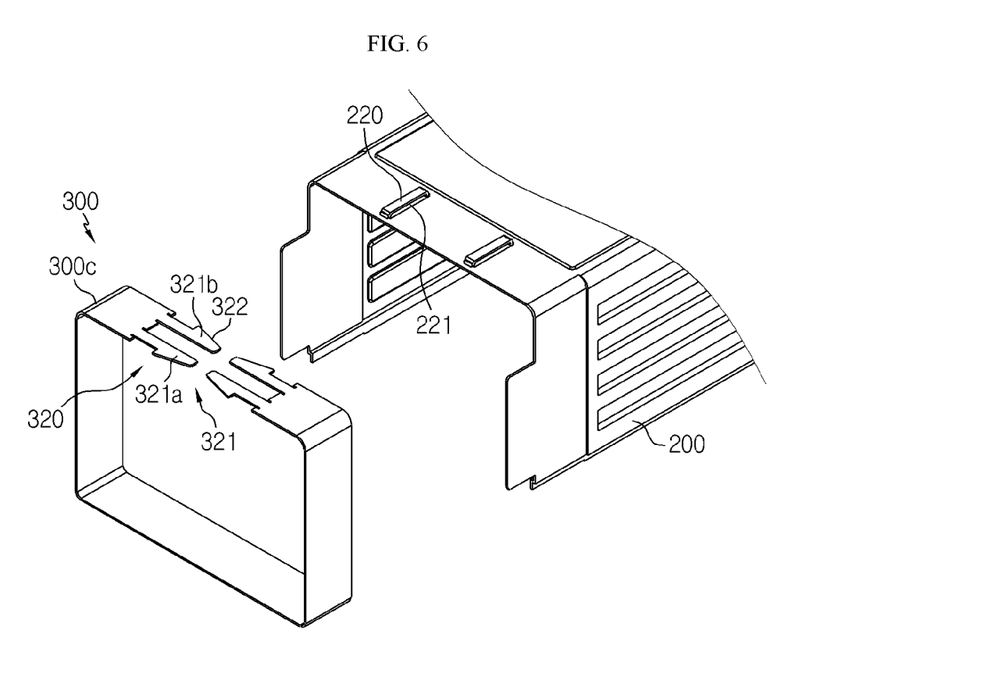
FIG. 6 is a view illustrating a state in which a support member is separated from a casing in a battery module according to a third embodiment of the present disclosure.
Figure 7:
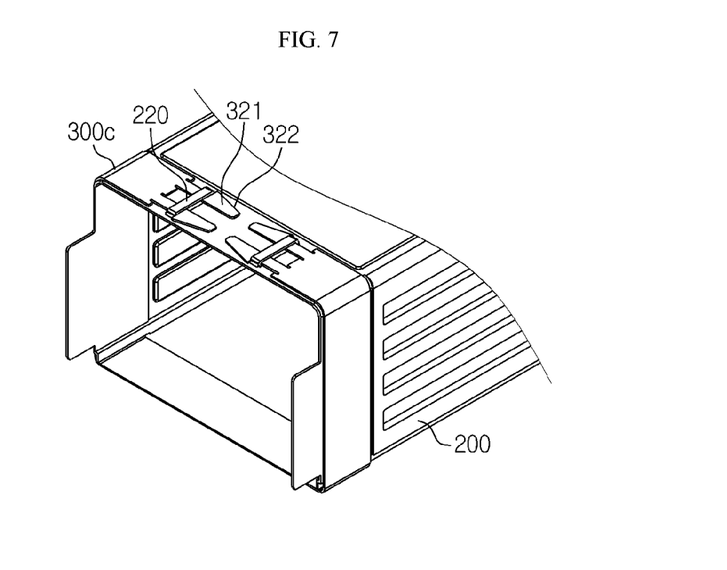
FIG. 7 is a view illustrating a state in which a support member is combined with a casing in the battery module according to the third embodiment of the present disclosure.

FIG. 6 is a schematic view illustrating a state in which a support member is separated from a casing in a battery module according to a third embodiment of the present disclosure, and FIG. 7 is a schematic view illustrating a state in which a support member is combined with a casing in a battery module according to the third embodiment of the present disclosure.

Hereinafter, functions and effects of the battery module 10 according to the third embodiment of the present disclosure will be described with reference to the drawings. However, portions common to contents described above for the battery module 10 according to the first or second embodiment of the present disclosure will be replaced by previous descriptions.

The third embodiment of the present disclosure is different from the first and second embodiments in that a receiving unit 220 is formed in the casing 200 and catching units are formed at both side ends of the support member 300, respectively.

Referring to FIG. 6, the casing 200 may be provided with the receiving unit 220 including a receiving groove 220 therein. In other words, the receiving unit 220 may protrude from the casing 200 so as to form a receiving groove 221. A catching unit 320 including a catching hook 321 may be formed at each end of the strap 300c so as to be combined to the receiving unit 220 by being inserted into the receiving groove 221 of the receiving unit 220. Here, both ends of the strap 300c may be provided symmetrically, however, the embodiment is not limited thereto. Referring to FIG. 6, the latching hooks 321 may be provided in a pair, and a pair of latching hooks 321a and 321b may be spaced apart from each other and configured to face in directions opposite to each other. Here, a slanted part 322 may be formed in the catching hook 321 and when the catching hook 321 is inserted into the receiving groove 221, the slanted part 322 may be guided along the receiving unit 220 and inserted into the receiving groove 221, so that an insertion of the catching hook 321 can be easy. In addition, referring to FIG. 7, the pair of latching hooks 321a and 321b may be inserted into and combined to the receiving groove 221 formed in the receiving unit 220, and thereby, the strap 300c may fix the casing 200.

Figure 8:
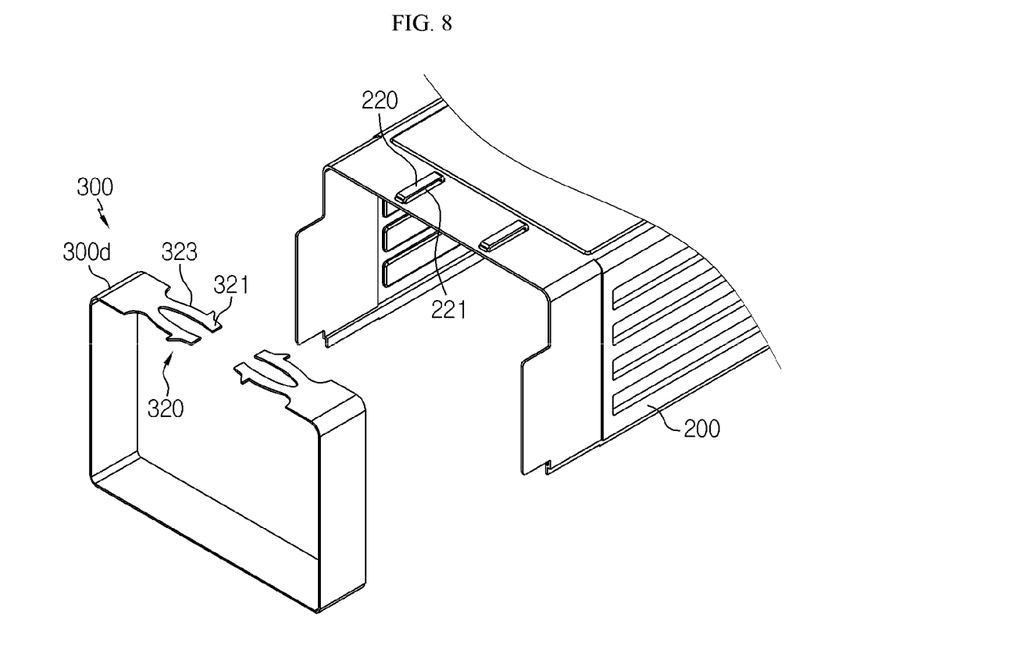
FIG. 8 is a view illustrating a state in which a support member is separated from a casing in a battery module according to a fourth embodiment of the present disclosure.
Figure 9:
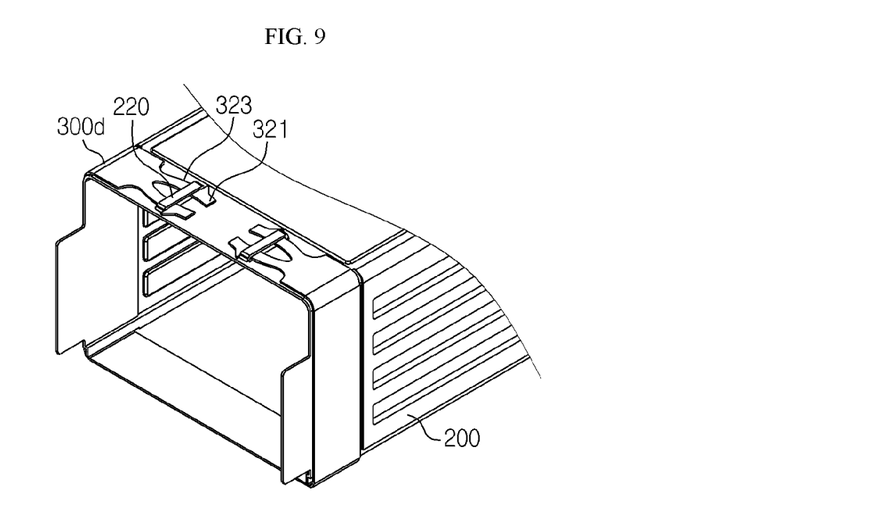
FIG. 9 is a view illustrating a state in which a support member is combined with a casing in the battery module according to the fourth embodiment of the present disclosure.

FIG. 8 is a schematic view illustrating a state in which a support member is separated from a casing in a battery module according to a fourth embodiment of the present disclosure, and FIG. 9 is a schematic view illustrating a state in which a support member is combined with a casing in a battery module according to the fourth embodiment of the present disclosure.

Hereinafter, functions and effects of the battery module 10 according to the fourth embodiment of the present disclosure will be described with reference to the drawings. However, parts common to contents described above for the battery module 10 according to the first, second, or third embodiment of the present disclosure will be replaced by previous descriptions.

The fourth embodiment differs from the third embodiment in that a round part is formed in at least a portion of the catching hook 321 in the fourth embodiment of the present disclosure.

Referring to FIG. 8, the catching hook 321 formed on a strap 300d may be provided in a pair, and the pair may be spaced apart from each other and face in directions opposite to each other as in the third embodiment. However, at least a portion of the catching hook 321 may be provided with a round part 323. As described above, when the round part 323 is formed in the catching hook 321, it may be possible to insert the round part 323 more smoothly than in the third embodiment.

A battery pack (not illustrated) according to an embodiment of the present disclosure may include at least one battery module 10 according to an embodiment of the present disclosure as described above. In addition, the battery pack (not illustrated) may include, in addition to such a battery module 10, a case for receiving the battery module 10, various devices for controlling the charging and discharging of the battery module 10 such as the BMS, a current sensor, and a fuse.

In addition, a vehicle (not illustrated) according to an embodiment of the present disclosure may include the battery module 10 or the battery pack (not illustrated) described above, and the battery pack (not illustrated) may include the battery module 10. In addition, the battery module 10 according to an embodiment of the present disclosure may be applied to the vehicle (not illustrated), for example, an electric vehicle or a hybrid vehicle, or to a certain vehicle (not illustrated) which is prepared to use electricity.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module and a battery pack including the battery module, and more particularly, to an industry related to a secondary battery.

What is claimed is:

1. A battery module comprising:
a cartridge assembly including a plurality of cartridges, each receiving a battery cell;
a casing surrounding the cartridge assembly; and
a support member configured to enclose the casing for supporting the casing,
wherein at least one combining protrusion is formed in the casing, and at least one combining groove, with which the combining protrusion is combined, is formed in the support member,
wherein a first combining protrusion of the combining protrusions formed on the casing is inserted into a first combining groove of the combining grooves formed in the support member, and bent and combined together.

2. The battery module of claim 1, wherein the support member comprises a strap of a band shape.

3. A battery module comprising:
a cartridge assembly including a plurality of cartridges, each receiving a battery cell;
a casing surrounding the cartridge assembly; and
a support member configured to enclose the casing for supporting the casing,
wherein at least one combining protrusion is formed in the casing, and at least one combining groove, with which the combining protrusion is combined, is formed in the support member, and
wherein a second combining protrusion of the combining protrusions formed on the casing is formed in a hook shape and is combined with a second combining groove of the combining grooves formed in the support member.

4. A battery module comprising:
a cartridge assembly including a plurality of cartridges, each receiving a battery cell;
a casing surrounding the cartridge assembly; and
a support member configured to enclose the casing for supporting the casing,
wherein a third combining groove is formed at one end of both side ends of the support member, and a third combining protrusion is formed at the other end of the both side ends of the support member, wherein the third combining protrusion is inserted into the third combining groove, and bent and combined together.

5. A battery module comprising:
a cartridge assembly including a plurality of cartridges, each receiving a battery cell;
a casing surrounding the cartridge assembly; and
a support member configured to enclose the casing for supporting the casing,
wherein at least one receiving unit comprising a receiving groove is formed in the casing, and a catching hook to be combined with the receiving groove after being inserted into the receiving groove is formed at each end of both side ends of the support member.

6. The battery module of claim 5, wherein the catching unit comprises a pair of catching hooks spaced apart from each other and configured to face in directions opposite to each other.

7. The battery module of claim 6, wherein a slanted part is formed in the catching hook to facilitate insertion into the receiving groove.

8. The battery module of claim 6, wherein a round part is formed in at least a portion of the catching hook.

9. A battery pack comprising a battery module according to claim 1.

10. A vehicle comprising a battery module according to claim 1.

11. The battery module of claim 3, wherein the support member comprises a strap of a band shape.

12. The battery module of claim 4, wherein the support member comprises a strap of a band shape.

13. The battery module of claim 5, wherein the support member comprises a strap of a band shape.

* * * * *